US012485269B2

(12) United States Patent
Gross et al.

(10) Patent No.: US 12,485,269 B2
(45) Date of Patent: Dec. 2, 2025

(54) VENTRICULAR ASSIST DEVICE

(71) Applicants: Yossi Gross, Mazor (IL); Oz Cabiri, Hod HaSharon (IL)

(72) Inventors: Yossi Gross, Mazor (IL); Oz Cabiri, Hod HaSharon (IL)

( * ) Notice: Subject to any disclaimer, the term of this patent is extended or adjusted under 35 U.S.C. 154(b) by 0 days.

(21) Appl. No.: 18/354,674

(22) Filed: Jul. 19, 2023

(65) Prior Publication Data
US 2025/0025678 A1    Jan. 23, 2025

(51) Int. Cl.
*A61M 60/554* (2021.01)
*A61M 60/178* (2021.01)
*A61M 60/268* (2021.01)
*A61M 60/438* (2021.01)
*A61M 60/508* (2021.01)

(52) U.S. Cl.
CPC ........ *A61M 60/178* (2021.01); *A61M 60/268* (2021.01); *A61M 60/438* (2021.01); *A61M 60/508* (2021.01)

(58) Field of Classification Search
CPC .............. A61M 60/178; A61M 60/268; A61M 60/508; A61M 60/438
See application file for complete search history.

(56) References Cited

U.S. PATENT DOCUMENTS

| | | | | |
|---|---|---|---|---|
| 3,327,322 A * | 6/1967 | Norton | ................ | A61M 60/427 417/339 |
| 3,842,440 A * | 10/1974 | Karlson | .............. | A61M 60/876 623/3.19 |
| 4,154,227 A * | 5/1979 | Krause | ................... | A61B 5/201 604/67 |
| 5,066,300 A * | 11/1991 | Isaacson | ............... | A61M 60/43 417/413.1 |
| 5,269,811 A * | 12/1993 | Hayes | ................. | A61M 60/833 623/3.24 |
| 5,314,469 A * | 5/1994 | Gao | .................... | A61M 60/894 623/3.18 |
| 2004/0116769 A1 * | 6/2004 | Jassawalla | .......... | A61M 60/148 600/16 |
| 2011/0243759 A1 * | 10/2011 | Ozaki | ................. | A61M 60/508 417/279 |
| 2013/0023776 A1 * | 1/2013 | Olde | ................... | A61M 1/3639 600/487 |
| 2014/0343672 A1 * | 11/2014 | Kargakis | ............. | A61M 60/871 623/3.19 |
| 2019/0301443 A1 * | 10/2019 | Willoughby | ........ | F04B 43/0081 |
| 2020/0038565 A1 * | 2/2020 | Vargas Fonseca | .. | A61M 60/148 |
| 2020/0188095 A1 * | 6/2020 | Liu | ....................... | A61F 2/2412 |

* cited by examiner

*Primary Examiner* — Rex R Holmes
*Assistant Examiner* — Jennifer L Ghand
(74) *Attorney, Agent, or Firm* — Dekel Patent Ltd.; David Klein

(57) ABSTRACT

A ventricular assist device (VAD) for use with a heart includes a housing, an upper membrane pump including a pumping chamber coupled to one-way upper inlet and outlet valves, a lower membrane pump including a pumping chamber coupled to one-way lower inlet and outlet valves, and an actuator that causes the upper membrane pump and the lower membrane pump to alternately draw blood into and pump blood out of their respective pumping chambers, and a control module in operative communication with the actuator, wherein the actuator operates with a pumping frequency which is greater than a pulse frequency of the heart.

15 Claims, 5 Drawing Sheets

VENTRICULAR ASSIST DEVICE

FIELD OF THE INVENTION

The present invention relates generally to ventricular assist devices and particularly to a ventricular assist device, which may be used as a left or right ventricular assist device or a biventricular assist device, with a pulsatile membrane pump.

BACKGROUND OF THE INVENTION

The human heart is comprised of four major chambers: two ventricles and two atria. The right-side heart receives oxygen-poor blood from the body into the right atrium and pumps it via the right ventricle to the lungs. The left-side heart receives oxygen-rich blood from the lungs into the left atrium and pumps it via the left ventricle to the aorta for distribution throughout the body. Due to any of a number of illnesses, including coronary artery disease, high blood pressure (hypertension), valvular regurgitation and calcification, damage to the heart muscle as a result of infarction or ischemia, myocarditis, congenital heart defects, abnormal heart rhythms or various infectious diseases, the left ventricle may be rendered less effective and thus unable to pump oxygenated blood throughout the body.

One type of mechanical implant often used for patients with end stage heart failure is a left ventricular assist device (LVAD). The LVAD is a surgically implanted pump that draws oxygenated blood from the left ventricle and pumps it directly to the aorta, thereby off-loading (reducing) the pumping work of the left ventricle. LVADs typically are used either as "bridge-to-transplant therapy" or "destination therapy." When used for bridge-to-transplant therapy, the LVAD is used to prolong the life of a patient who is waiting for a heart transplant. When a patient is not suitable for a heart transplant, the LVAD may be used as a destination therapy to prolong the life, or improve the quality of life, of the patient, but generally such prolongation is for only a couple years In the prior art, an LVAD includes an inlet cannula, a pump, and an outlet cannula, and is connected to an extracorporeal battery and control unit. The inlet cannula is directly connected to the left ventricle, typically at the apex, and delivers blood from the left ventricle to the pump. The outlet cannula is connected to the aorta and delivers blood from the pump to the aorta. Typically, the outlet cannula of the pump is extended using a hose-type structure, such as a Dacron graft, to reach a proper delivery location on the aorta.

The LVAD of the prior art is typically large and thus requires open heart surgery with life-threatening risks.

SUMMARY OF THE INVENTION

The present invention seeks to provide an improved ventricular assist device, which may be used as a left or right ventricular assist device (LVAD or RVAD) or a biventricular assist device (BVAD), with a pulsatile membrane pump, as is described more in detail hereinbelow.

There is provided in accordance with a non-limiting embodiment of the present invention a ventricular assist device (VAD) for use with a heart, including a housing, an upper membrane pump including a pumping chamber coupled to one-way upper inlet and outlet valves, the pumping chamber having a volume between an upper portion of the housing and a membrane sealed to the housing, and an upper connecting rod, one end of which is coupled to a crank pin of a crankshaft and an opposite end of which is coupled to the membrane of the upper membrane pump, a lower membrane pump including a pumping chamber coupled to one-way lower inlet and outlet valves, the pumping chamber having a volume between a lower portion of the housing and a membrane sealed to the housing, and a lower connecting rod, one end of which is coupled to the crank pin of the crankshaft and an opposite end of which is coupled to the membrane of the lower membrane pump, and an actuator coupled to the crankshaft configured to rotate the crankshaft and cause the upper membrane pump and the lower membrane pump to alternately draw blood into and pump blood out of their respective pumping chambers, and a control module in operative communication with the actuator, wherein the actuator operates with a pumping frequency which is greater than a pulse frequency of the heart.

In accordance with a non-limiting embodiment of the present invention the control module includes electronics, a microprocessor, sensors, and other control and operation elements for controlled actuation of the actuator.

In accordance with a non-limiting embodiment of the present invention the connecting rod of the upper membrane pump is coupled to a strain relief member which is arranged to press against the membrane of the upper membrane pump, and the connecting rod of the lower membrane pump is coupled to a strain relief member which is arranged to press against the membrane of the lower membrane pump.

In accordance with a non-limiting embodiment of the present invention, for each of the upper and lower membrane pumps, an intermediate member is disposed between the strain relief member and the membrane.

In accordance with a non-limiting embodiment of the present invention, for each of the upper and lower membrane pumps, an end of the connecting rod near the membrane passes through apertures formed in the strain relief member and the intermediate member, and seals are disposed on the end of the connecting rod, located on opposing inner and outer surfaces of the strain relief member.

In accordance with a non-limiting embodiment of the present invention, for each of the upper and lower membrane pumps, the membrane includes a hybrid diaphragm made of a combination of materials.

In accordance with a non-limiting embodiment of the present invention an inner surface of each of the pumping chambers includes a diamond-like carbon (DLC) coating.

In accordance with a non-limiting embodiment of the present invention the connecting rod of the lower membrane pump is bifurcated with two portions that are coupled to the crank pin.

In accordance with a non-limiting embodiment of the present invention the actuator includes a DC mini-gear motor.

There is provided in accordance with a non-limiting embodiment of the present invention a method of using the ventricular assist device (VAD) in a patient having an aorta and a heart having a left atrium and a left ventricle, including using the VAD as a left ventricular assist device (LVAD) in which inlets to the upper and lower membrane pumps are from the left atrium, and outlets from the upper and lower membrane pumps are to the aorta via a graft coupled to the aorta.

In accordance with a non-limiting embodiment of the present invention inlets to the upper and lower membrane pumps are from the left atrium and the left ventricle.

There is provided in accordance with a non-limiting embodiment of the present invention a method of using the ventricular assist device (VAD) in a patient having an aorta, a pulmonary artery, and a heart having a left atrium, a left ventricle, a right atrium, and a right ventricle, including using the VAD as a biventricular assist device (BVAD) in which an inlet to the upper membrane pump is from the right atrium and an outlet from the upper membrane pump is to the pulmonary artery, and an inlet to the lower membrane pump is from the left atrium and an outlet from the lower membrane pump is to the aorta via a graft coupled to the aorta.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

Figure 1:
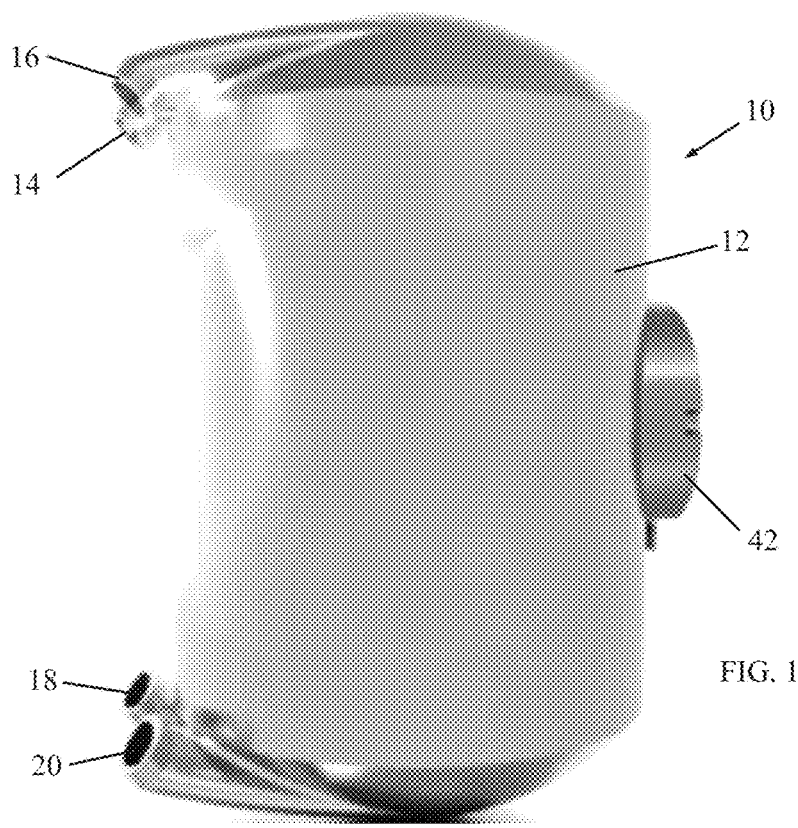
FIG. 1 is a simplified illustration of a ventricular assist device (VAD), in accordance with a non-limiting embodiment of the present invention, showing the external design.
Figure 2A:
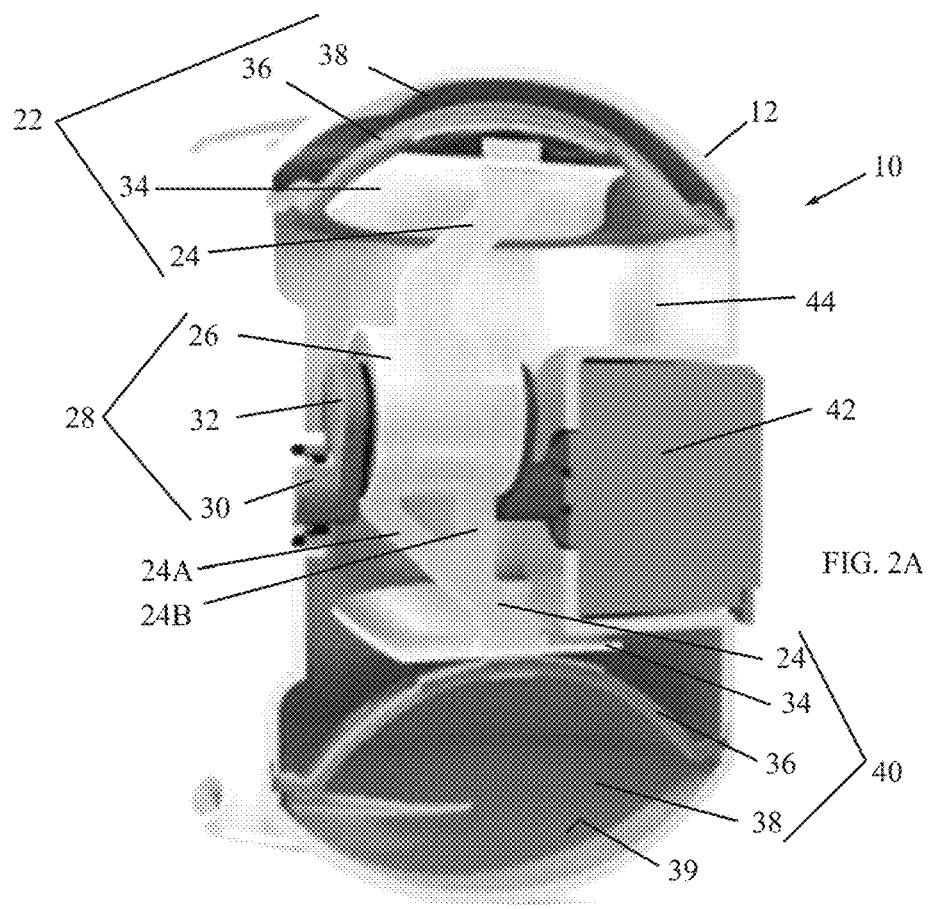
FIGS. 2A-2C are simplified illustrations of the VAD showing the internal components, in accordance with a non-limiting embodiment of the present invention, wherein in FIG. 2A the upper membrane pump is in systole (to pump blood, such as blood received from the left atrium, towards the lower membrane pump) and the lower membrane pump is in diastole (to receive blood from the upper membrane pump), and in FIGS. 2B and 2C two views are shown in which the lower membrane pump is in systole (to pump blood received, from the action of the upper membrane pump, to the aorta, for example) and the upper membrane pump is in diastole (to receive blood from the left atrium)

Reference is now made to FIGS. 1 and 2A, which illustrate a ventricular assist device (VAD) 10, in accordance with a non-limiting embodiment of the present invention.

FIG. 1 shows the external design of the VAD 10, which may include a housing 12, made of a biologically safe material, such as but not limited to, a titanium alloy or stainless steel alloy, which includes one-way upper inlet and outlet valves 14 and 16, respectively, and one-way lower inlet and outlet valves 18 and 20, respectively. Housing 12 is preferably a sealed housing, so the internal components are sealed from the internal environment of the body and the internal environment of the body is sealed from and not contaminated by the VAD 10.

FIG. 2A illustrates the internal components of the VAD 10. The VAD 10 may include an upper membrane pump 22, which may include a connecting rod 24, one end of which is connected to a crank pin 26 of a crankshaft 28. Crankshaft 28 has a main journal 30 and crank webs 32 on which crank pin 26 is coupled, as is known in the art of crankshafts. The other end of connecting rod 24 may be coupled to a strain relief member 34, which may be shaped like a plate, dish, disc or other shape. It is noted that connecting rod 24 does not necessarily have a rod shape, and may be shaped as a bar or other shapes. The strain relief member 34 may be arranged to press against a membrane 36 (as described more in detail below with reference to FIG. 2C).

Membrane 36 may be, without limitation, a hybrid diaphragm made of a combination of materials, such as but not limited to, pericardial tissue and polycarbonate urethane. The outer perimeter of membrane 36 may be sealed and affixed to the inner surface of housing 12 to define a pumping chamber 38 between membrane 36 and the end of housing 12. Membrane 36 alternatively bulges upwards to apply a pumping force on blood found in pumping chamber 38 (systole), and inverts to bulge downwards to draw blood into pumping chamber 38 (diastole).

The inner surface of pumping chamber 38 may have a diamond-like carbon (DLC) coating 39, which provides a very low friction surface. In this manner, the blood contacting surfaces of upper membrane pump 22 are made of bioprosthetic materials, which present low shear stress on red blood cells, thereby preventing hemolysis and formation of blood clots. The flow is laminar and not turbulent.

Similarly, and preferably identically, to upper membrane pump 22, VAD 10 may include a lower membrane pump 40, and like elements of the two pumps 22 and 40 are designated by like reference numerals. In the illustrated non-limiting embodiment, the connecting rod 24 of lower membrane pump 40 is connected to the same crank pin 26 of crankshaft 28. The connecting rod 24 of lower membrane pump 40 may be bifurcated with two portions 24A and 24B that are coupled to crank pin 26; the connecting rod 24 of upper membrane pump 22 is not bifurcated and is coupled to crank pin 26 between the two portions 24A and 24B of the connecting rod 24 of lower membrane pump 40. Other configurations are also within the scope of the invention.

The terms "upper" and "lower" are used in the sense of the drawings and are not limiting; when installed in a body, the "upper" component may be lower than the "lower" component.

Crankshaft 28 may be coupled to an actuator 42, such as but not limited to, a DC mini-gear motor. Housing 12 may include therein a control module 44, which may include electronics, a microprocessor, sensors, and other control and operation elements for controlled actuation of actuator 42. The control module 44 may optionally include receiving and transmitting components for interfacing with IoT platforms, personal communication devices, cloud services, etc. Alternatively, control module 44 may be partially or fully external to housing 12.

Figure 2B:
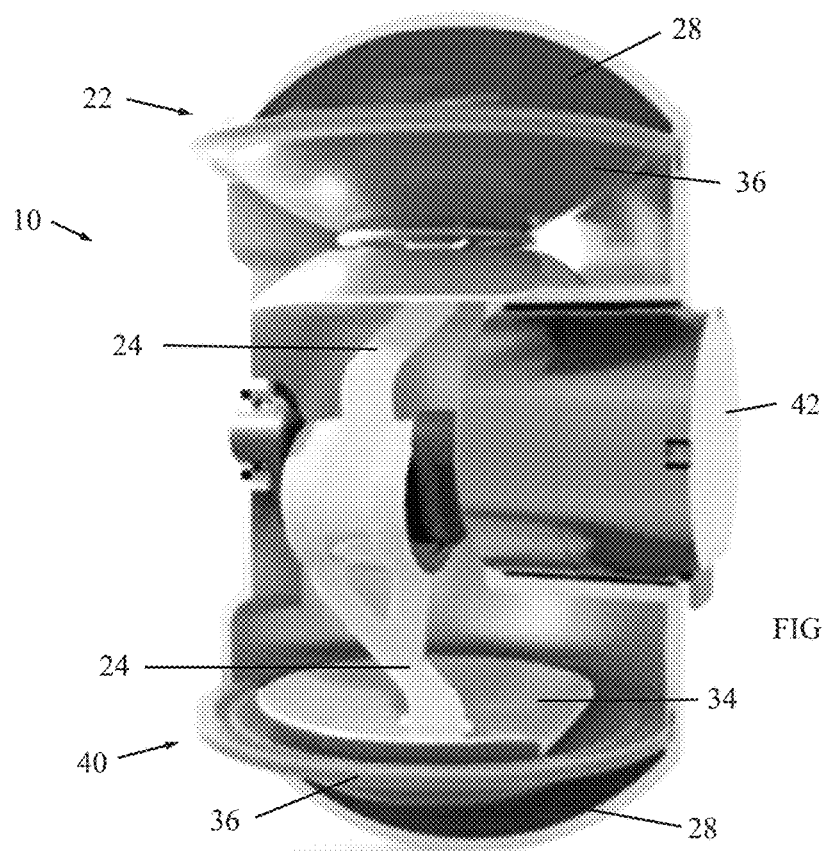
Figure 2C:
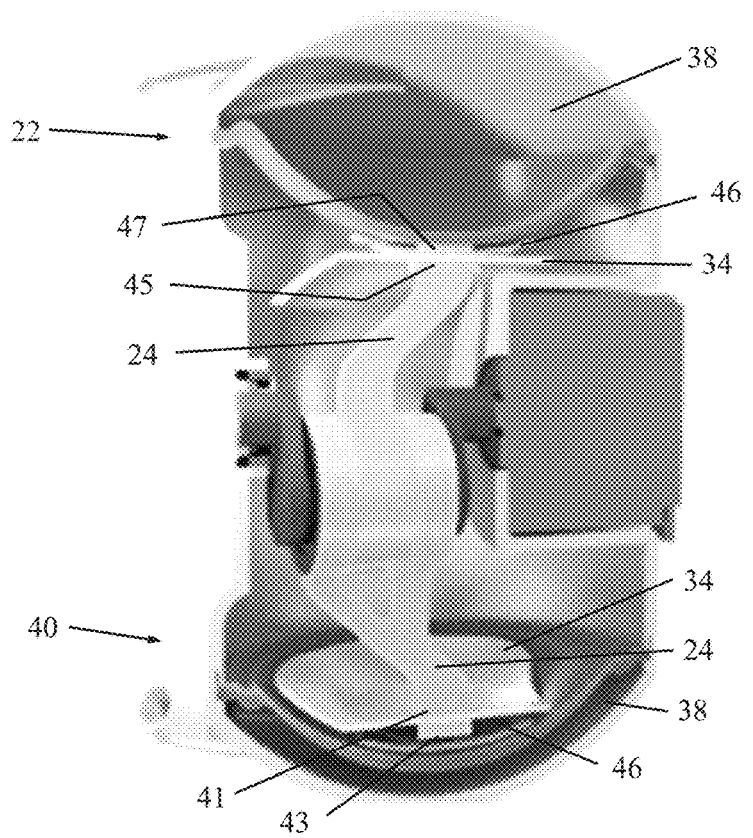

Reference is now made to FIG. 2C. For each of pumps 22 and 40, an intermediate member 46 may be disposed between strain relief member 34 and membrane 36. The end of connecting rod 24 near membrane 36 may pass through apertures 41 and 43 formed in strain relief member 34 and intermediate member 46, respectively. Seals 45 and 47 may be disposed on the end of connecting rod 24, located on opposing inner and outer surfaces of strain relief member 34, to ensure that the pumping chamber 38 is sealed and no blood leaks out from it.

One typical mode of operation of VAD 10 is now explained with reference to FIGS. 2A-2B and 3A-3B.

Figure 3A:
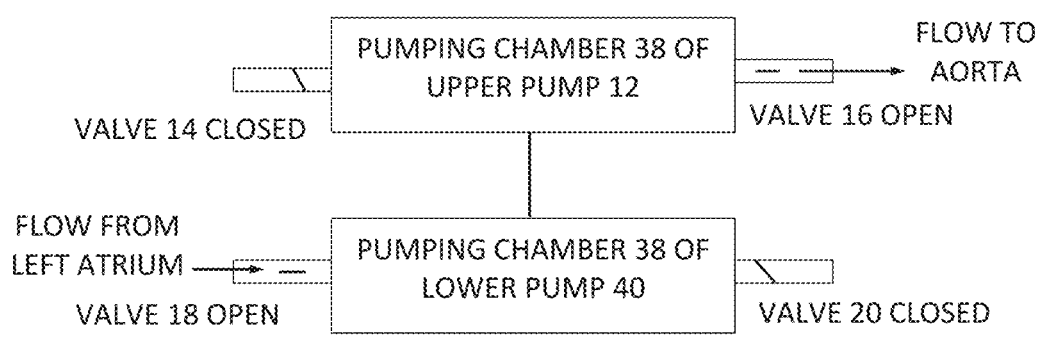
FIGS. 3A and 3B are simplified diagrams of the opening and closing of the one-way valves of the VAD during operation.
Figure 4A:
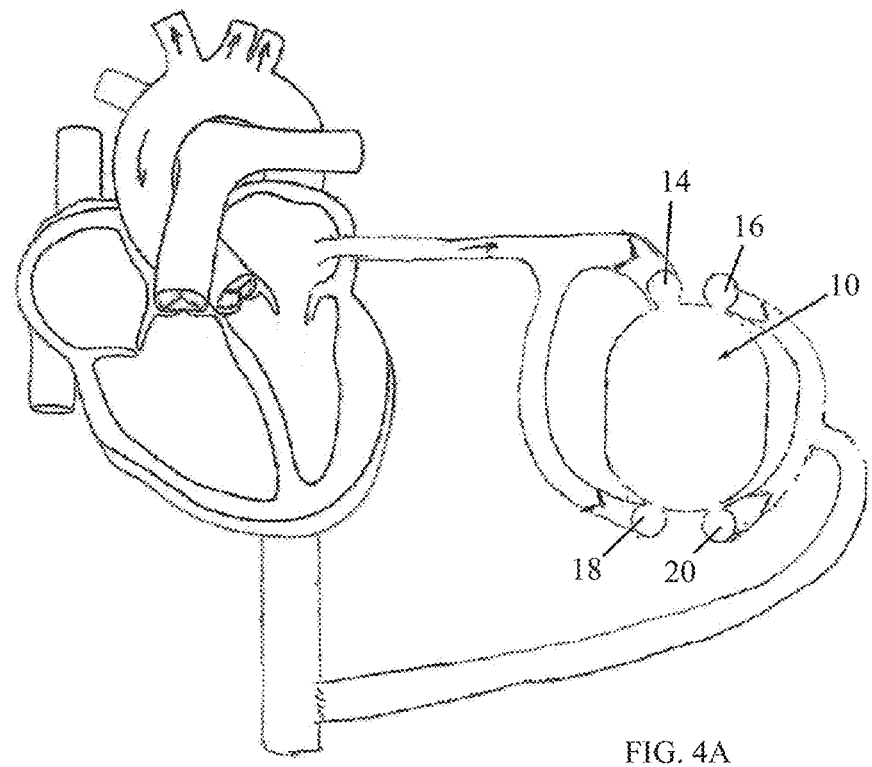
FIG. 4A is a simplified illustration of the VAD implanted and coupled to the heart and used as an LVAD, in which the inlets to the upper and lower membrane pumps are from the left atrium and the outlets from the upper and lower membrane pumps are to the (descending) aorta.

In FIG. 2A and FIG. 3A, the upper membrane pump 22 is in systole so that it pumps blood out of pumping chamber 38 through one-way upper outlet valve 16 towards the (descending) aorta (as in FIG. 4A). The blood has been drawn before this into pumping chamber 38 of upper membrane pump 22 from the left atrium via the one-way upper inlet valve 14. The lower membrane pump 40 is in diastole to receive blood from the left atrium via the one-way lower inlet valve 18 (as in FIG. 4A).

Figure 3B:
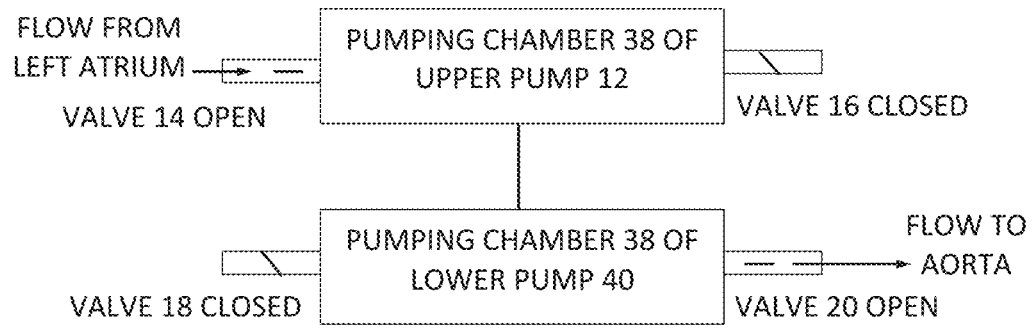

In FIGS. 2B and 3B, the lower membrane pump 40 is in systole to pump the blood that has been received in its pumping chamber 38 from the left atrium via one-way lower inlet valve 18, out through to the aorta, via one-way lower outlet valve 20. The upper membrane pump 22 is in diastole to receive blood from the left atrium into its pumping chamber 38 via one-way upper inlet valve 14.

In this manner, VAD 10 provides a pulsatile mode blood flow, at a flow rate, without limitation, of 0-5 liters/min.

VAD 10 may be used as an LVAD, and may be installed in the patient, without limitation, in a left thoracotomy approach, in which the inflow is connected to the left atrial appendage and the outflow to the descending aorta.

Reference is now made to FIG. 4A, which illustrates the VAD 10 implanted and coupled to the heart and used as an LVAD, in which the inlets to the upper and lower membrane pumps are from the left atrium, and the outlets from the upper and lower membrane pumps are to the (descending) aorta, such as via a graft (e.g., made of DACRON).

Figure 4B:
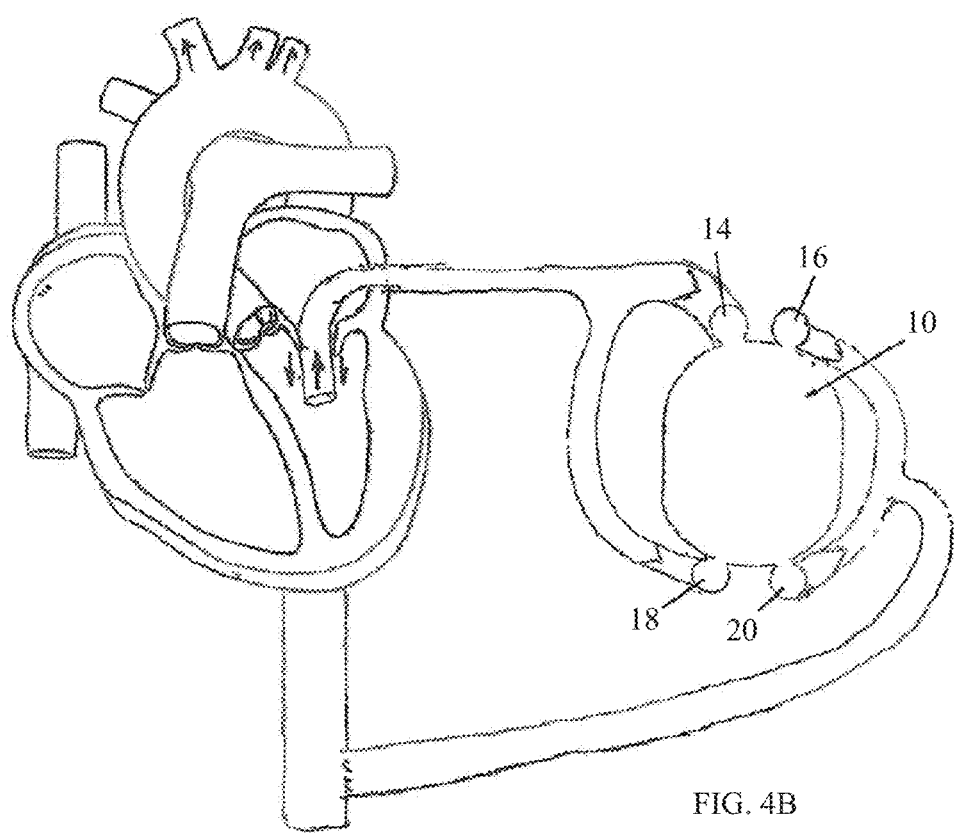
FIG. 4B is a simplified illustration of the VAD implanted and coupled to the heart, and used as an LVAD, in which the inlets to the upper and lower membrane pumps are from the left atrium and the left ventricle, and the outlets from the upper and lower membrane pumps are to the (descending) aorta.

Reference is now made to FIG. 4B, which illustrates the VAD 10 implanted and coupled to the heart, and used as an LVAD, in which the inlets to the upper and lower membrane pumps are from the left ventricle and the left atrium (e.g. via a hole formed in the inlet tube in the left atrium), and the outlets from the upper and lower membrane pumps are to the (descending) aorta.

Figure 4C:
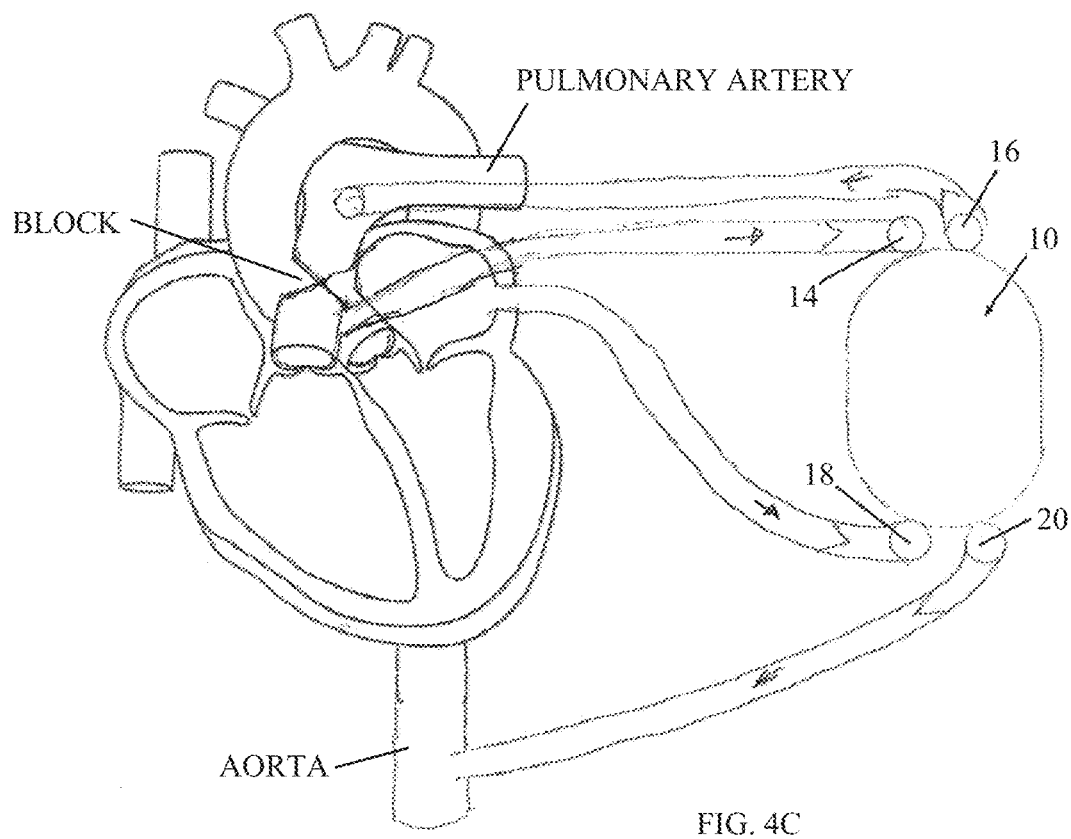
FIG. 4C is a simplified illustration of the VAD implanted and coupled to the heart and used as a BVAD, in which the inlet to the upper membrane pump is from a lower part of the pulmonary artery and the outlet from the upper membrane pump is to an upper part of the pulmonary artery, and the inlet to the lower membrane pump is from the left atrium and the outlet from the lower membrane pump is to the (descending) aorta.

Reference is now made to FIG. 4C, which illustrates the VAD 10 implanted and coupled to the heart and used as a BVAD, in which the inlet to the upper membrane pump is from the lower part of the pulmonary artery and the outlet from the upper membrane pump is to the upper part of the pulmonary artery (used in the case where there is a block between the lower and upper parts of the pulmonary artery, and the inlet to the lower membrane pump is from the left atrium and the outlet from the lower membrane pump is to the (descending) aorta.

The human pulse rate is generally between 40 and 120 beats per minute, which is equivalent to 0.6-2 Hz. The normal average pressures during systole and diastole in the average human heart are the following:

| Heart Chamber | Pressure (mm Hg) |
| --- | --- |
| Right Atrium | 0-4 |
| Right Ventricle | 25 Systole/4 Diastole |
| | (In the pulmonary artery: 10 diastole) |
| Left Atrium | 8-10 |
| Left Ventricle | 120 Systole/10 Diastole |
| | (In the aorta: 80 diastole) |

In accordance with a non-limiting embodiment of the invention, VAD 10 has a pumping frequency which is greater than the pulse frequency of the heart, such as at least twice the pulse frequency (4 Hz); alternatively, 5 Hz; alternatively, 6 Hz; alternatively, 7 Hz; alternatively, 8 Hz; alternatively, 9 Hz; and alternatively, 10 Hz. The increased frequency of the pumping frequency of the VAD does not adversely affect the function of the heart, even though it is not necessarily in synchronization with the natural valve closing and opening in the heart. The reason is believed to be that the higher frequency will cause the blood to pass the natural valves when they open and any pressure provided by the blood flow from the VAD when the natural valve is closed simply means the blood flow is only temporarily blocked and the blood flow will continue through the valve when it opens.

What is claimed is:

1. A ventricular assist device (VAD) for use with a heart, comprising:
   a housing;
   an upper membrane pump comprising a pumping chamber coupled to one-way upper inlet and outlet valves, said pumping chamber having a volume between an upper portion of said housing and a membrane sealed to said housing, and an upper connecting rod, one end of which is coupled to a crank pin of a crankshaft and an opposite end of which is coupled to a center of said membrane of said upper membrane pump, said crankshaft comprising a main journal and crank webs on which said crank pin is coupled;
   a lower membrane pump comprising a pumping chamber coupled to one-way lower inlet and outlet valves, said pumping chamber having a volume between a lower portion of said housing and a membrane sealed to said housing, and a lower connecting rod, one end of which is coupled to said crank pin of said crankshaft and an opposite end of which is coupled to a center of said membrane of said lower membrane pump; and
   an actuator comprising an output shaft coupled to and coaxial with said main journal of said crankshaft, and configured to rotate said crankshaft and cause said upper membrane pump and said lower membrane pump to alternately draw blood into and pump blood out of their respective pumping chambers, and a control module in operative communication with said actuator, and
   wherein said actuator is radially offset away from the center of said membrane of said upper membrane pump and the center of said membrane of said lower membrane pump.

2. The VAD according to claim 1, wherein said control module comprises electronics, a microprocessor, and sensors for controlled actuation of said actuator.

3. The VAD according to claim 1, wherein for each of said upper and lower membrane pumps, an end of said upper connecting rod and an end of said lower connecting rod near said membrane passes through apertures formed in a strain relief member and an intermediate member, and seals are disposed on said end of said upper connecting rod and on said end of said lower connecting rod, located on opposing inner and outer surfaces of said strain relief member.

4. The VAD according to claim 1, wherein for each of said upper and lower membrane pumps, said membrane comprises a hybrid diaphragm made of a combination of materials.

5. The VAD according to claim 4, wherein said combination of materials comprises pericardial tissue and polycarbonate urethane.

6. The VAD according to claim 1, wherein an inner surface of each of said pumping chambers comprises a diamond-like carbon (DLC) coating.

7. The VAD according to claim 1, wherein said lower connecting rod of said lower membrane pump is bifurcated with two portions that are coupled to said crank pin.

8. The VAD according to claim 1, wherein said actuator comprises a DC mini-gear motor.

9. A method of using the ventricular assist device (VAD) of claim 1 in a patient having an aorta and a heart having a left atrium and a left ventricle, comprising using said VAD as a left ventricular assist device (LVAD) in which inlets to said upper and lower membrane pumps are from the left atrium, and outlets from said upper and lower membrane pumps are to the aorta via a graft coupled to the aorta.

10. The method according to claim 9, wherein inlets to said upper and lower membrane pumps are from the left atrium and the left ventricle.

11. A method of using the ventricular assist device (VAD) of claim 1 in a patient having an aorta, a pulmonary artery, and a heart having a left atrium, a left ventricle, a right atrium, and a right ventricle, comprising using said VAD as a biventricular assist device (BVAD) in which an inlet to said upper membrane pump is from a lower part of the pulmonary artery and an outlet from said upper membrane pump is to an upper part of the pulmonary artery, and an inlet to said lower membrane pump is from the left atrium and an outlet from said lower membrane pump is to the aorta via a graft coupled to the aorta.

12. The VAD according to claim 1, wherein said actuator operates with a pumping frequency which is greater than a pulse frequency of the heart.

13. The VAD according to claim 1, wherein said upper connecting rod of said upper membrane pump is coupled to a strain relief member which is arranged to press against said membrane of said upper membrane pump, and said lower connecting rod of said lower membrane pump is coupled to a strain relief member which is arranged to press against said membrane of said lower membrane pump.

14. The VAD according to claim 1, wherein for each of said upper and lower membrane pumps, an intermediate member is disposed between a strain relief member and said membrane.

15. The VAD according to claim 1, wherein an axial center of said crankshaft is radially offset from the center of said membrane of said upper membrane pump and the center of said membrane of said lower membrane pump.

\* \* \* \* \*